(12) United States Patent
Hejl, Jr. et al.

(10) Patent No.: US 12,093,735 B2
(45) Date of Patent: Sep. 17, 2024

(54) DISTRIBUTED REALIZATION OF DIGITAL CONTENT

(71) Applicant: Electronic Arts Inc., Redwood City, CA (US)

(72) Inventors: James N. Hejl, Jr., Winter Park, FL (US); Christopher K. Prather, Orlando, FL (US)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 17/150,975

(22) Filed: Jan. 15, 2021

(65) Prior Publication Data
US 2021/0248012 A1 Aug. 12, 2021

Related U.S. Application Data

(63) Continuation of application No. 16/188,940, filed on Nov. 13, 2018, now Pat. No. 10,896,063, which is a continuation of application No. 13/611,506, filed on Sep. 12, 2012, now Pat. No. 10,127,082.

(60) Provisional application No. 61/620,529, filed on Apr. 5, 2012.

(51) Int. Cl.
*G06F 9/50* (2006.01)
*A63F 13/00* (2014.01)
*A63F 13/30* (2014.01)

(52) U.S. Cl.
CPC .......... *G06F 9/5027* (2013.01); *A63F 13/00* (2013.01); *A63F 13/30* (2014.09); *G06F 2209/509* (2013.01); *G06F 2209/549* (2013.01)

(58) Field of Classification Search
CPC .......... G06F 9/5027; G06F 2209/509; G06F 2209/549; A63F 13/00
See application file for complete search history.

(56) References Cited

U.S. PATENT DOCUMENTS

| 5,953,506 A | 9/1999 | Kalra et al. |
| 6,421,058 B2 | 7/2002 | Parikh et al. |
| 6,570,564 B1 | 5/2003 | Sowizral et al. |
| 6,631,403 B1* | 10/2003 | Deutsch ......... H04N 21/234318 |
| | | 375/E7.006 |
| 6,636,214 B1 | 10/2003 | Leather et al. |
| 7,100,020 B1 | 8/2006 | Brightman et al. |

(Continued)

FOREIGN PATENT DOCUMENTS

| CN | 105409224 A | 3/2016 |
| CN | 105959820 A | 9/2016 |

(Continued)

OTHER PUBLICATIONS

Ito, Asynch Queue, 2012, in 7 pages.

*Primary Examiner* — Beau D Spratt
(74) *Attorney, Agent, or Firm* — Knobbe, Martens, Olson & Bear, LLP

(57) ABSTRACT

Techniques are disclosed that can obtain a description of intended digital content data in a producer computer, create a task graph of the intended digital content data, send the task graph to a consumer computer over a bus, execute the task graph locally in the consumer computer to realize an approximation of the intended digital content data, and render the approximation of the intended digital content data on a local display or other appropriate output device.

17 Claims, 4 Drawing Sheets

(56) References Cited

U.S. PATENT DOCUMENTS

| | | |
|---|---|---|
| 7,159,217 B2 | 1/2007 | Pulsipher et al. |
| 7,796,155 B1 | 9/2010 | Neely, III et al. |
| 8,171,461 B1 | 5/2012 | Kilgard et al. |
| 8,200,796 B1* | 6/2012 | Margulis ............ H04N 21/4122 |
| | | 709/217 |
| 8,266,213 B2* | 9/2012 | Crowder ............. G07F 17/3223 |
| | | 463/31 |
| 8,319,825 B1 | 11/2012 | Urbach |
| 8,341,550 B2 | 12/2012 | de Heer |
| 8,719,336 B2 | 5/2014 | Douceur et al. |
| 9,094,667 B1 | 7/2015 | Hej |
| 9,199,165 B2 | 12/2015 | Zahn et al. |
| 9,374,552 B2 | 6/2016 | Taraki et al. |
| 9,415,304 B2* | 8/2016 | Harp ........................ A63F 13/53 |
| 9,643,093 B2 | 5/2017 | Zahn et al. |
| 9,694,281 B2 | 7/2017 | Garden |
| 9,700,789 B2 | 7/2017 | Cotter |
| 9,706,214 B2* | 7/2017 | Wu ...................... H04N 19/176 |
| 9,795,879 B2 | 10/2017 | Colenbrander |
| 10,127,082 B2 | 11/2018 | Hejl, Jr. et al. |
| 10,179,290 B2 | 1/2019 | Benedetto |
| 10,296,391 B2 | 5/2019 | Justice et al. |
| 10,315,113 B2 | 6/2019 | Marr et al. |
| 10,376,781 B2 | 8/2019 | Marr et al. |
| 10,403,022 B1 | 9/2019 | Silva et al. |
| 10,537,799 B1 | 1/2020 | Burke |
| 10,543,430 B2 | 1/2020 | Osman et al. |
| 10,589,171 B1 | 3/2020 | Burke |
| 10,870,060 B2 | 12/2020 | Benedetto |
| 10,896,063 B2 | 1/2021 | Hejl, Jr. et al. |
| 10,918,938 B2 | 2/2021 | Karlsson |
| 10,979,744 B2 | 4/2021 | Mcauley et al. |
| 10,987,579 B1 | 4/2021 | Borovikov et al. |
| 11,213,745 B1 | 1/2022 | Burke |
| 11,369,873 B2 | 6/2022 | Smullen et al. |
| 11,565,178 B2 | 1/2023 | Burke |
| 11,724,182 B2 | 8/2023 | Karlsson |
| 11,724,184 B2 | 8/2023 | Borovikov et al. |
| 2006/0105841 A1 | 5/2006 | Rom et al. |
| 2006/0159166 A1 | 7/2006 | Mohsenian |
| 2006/0174021 A1* | 8/2006 | Osborne ................. H04L 65/65 |
| | | 709/230 |
| 2007/0030276 A1 | 2/2007 | MacInnis et al. |
| 2007/0143664 A1 | 6/2007 | Fang et al. |
| 2008/0303835 A1 | 12/2008 | Swift et al. |
| 2008/0303837 A1 | 12/2008 | Swift et al. |
| 2009/0002379 A1 | 1/2009 | Baeza et al. |
| 2009/0027383 A1 | 1/2009 | Bakalash et al. |
| 2009/0119736 A1 | 5/2009 | Perlman et al. |
| 2009/0135190 A1 | 5/2009 | Bakalash et al. |
| 2009/0275414 A1 | 11/2009 | Lee et al. |
| 2009/0318219 A1* | 12/2009 | Koustas ............... G07F 17/3262 |
| | | 463/23 |
| 2010/0063992 A1 | 3/2010 | Ma et al. |
| 2010/0134494 A1 | 6/2010 | Lim et al. |
| 2010/0166056 A1 | 7/2010 | Perlman et al. |
| 2010/0166064 A1 | 7/2010 | Perlman et al. |
| 2010/0255909 A1 | 10/2010 | McNamara |
| 2011/0126190 A1 | 5/2011 | Urbach |
| 2011/0175923 A1* | 7/2011 | Mahajan ............... G06F 9/5027 |
| | | 345/522 |
| 2012/0004040 A1 | 1/2012 | Pereira et al. |
| 2012/0004042 A1* | 1/2012 | Perry .................... A63F 13/355 |
| | | 463/42 |
| 2012/0084789 A1 | 4/2012 | Iorio |
| 2013/0024545 A1* | 1/2013 | Sheppard ................ A63F 13/12 |
| | | 709/217 |
| 2013/0123019 A1 | 5/2013 | Sullivan et al. |
| 2013/0191713 A1* | 7/2013 | Porras Luraschi . G06F 16/9574 |
| | | 715/221 |
| 2013/0203496 A1 | 8/2013 | Kruglick |
| 2013/0337916 A1 | 12/2013 | Saretto et al. |
| 2014/0085314 A1* | 3/2014 | Steinke ................... G06T 9/001 |
| | | 345/473 |
| 2014/0101331 A1 | 4/2014 | Bartlett |
| 2014/0184602 A1 | 7/2014 | Tuffreau et al. |
| 2014/0274368 A1 | 9/2014 | Cotter |
| 2014/0286438 A1 | 9/2014 | Apte |
| 2015/0062132 A1 | 3/2015 | Chann et al. |
| 2015/0133216 A1 | 5/2015 | Heinz, II |
| 2015/0221122 A1 | 8/2015 | Son et al. |
| 2016/0171765 A1 | 6/2016 | Mehr |
| 2016/0296840 A1 | 10/2016 | Kaewell et al. |
| 2016/0332081 A1 | 11/2016 | Marr et al. |
| 2017/0113135 A1 | 4/2017 | Marr et al. |
| 2017/0354878 A1 | 12/2017 | Posin |
| 2018/0284871 A1 | 10/2018 | Surti et al. |
| 2018/0296912 A1 | 10/2018 | Hicks et al. |
| 2019/0088015 A1 | 3/2019 | Makinen et al. |
| 2019/0141374 A1 | 5/2019 | McAuley et al. |
| 2020/0027269 A1 | 1/2020 | Jiang et al. |
| 2020/0197821 A1 | 6/2020 | Benedetto |
| 2020/0230499 A1 | 7/2020 | Buser et al. |
| 2020/0368616 A1 | 11/2020 | Delamont |
| 2021/0236923 A1 | 8/2021 | Karlsson |
| 2021/0316212 A1 | 10/2021 | Borovikov et al. |
| 2022/0193541 A1 | 6/2022 | Burke |

FOREIGN PATENT DOCUMENTS

| | | |
|---|---|---|
| CN | 107735152 A | 2/2018 |
| CN | 109479163 A | 3/2019 |
| KR | 10-2019-0028737 A | 3/2019 |
| WO | WO 2017/218303 A1 | 12/2017 |

* cited by examiner

200

400

DISTRIBUTED REALIZATION OF DIGITAL CONTENT

CROSS-REFERENCE TO RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

There is much interest in developing new techniques for physically separate computers to work together to share resources and processing responsibilities for various applications. One such area of interest is cloud gaming. In cloud gaming, a goal is to allow a video game application to be distributed to reside, execute, and be rendered on multiple computers. There is a need for software patterns and system architectures that optimize such a distributed nature and parallelism when executing applications across networks of conventional processors and emerging heterogeneous processing units.

SUMMARY

Disclosed are techniques to distribute digital content in a platform independent manner. A producer computer may produce a task graph of intended digital content data. The producer computer may send the task graph to a consumer computer over a bus. The consumer computer may execute the task graph locally to realize an approximation of the intended digital content data. The realized approximation of the intended digital content data may then be rendered on hardware coupled to the consumer computer.

In one embodiment, the task graph may comprise a collection of execution nodes. Each execution node may define a specific data transformation that accepts one or more input data streams and produces one or more output data streams.

In another embodiment, multiple producer computers may contribute to the creation of a task graph and multiple consumer computers may receive a portion of a task graph.

In another embodiment, a task graph may be mutable. This means the task graph may be broken up and sent as a binary stream in a non-serial fashion.

Certain illustrative aspects are described herein in connection with the following description and the annexed drawings. These aspects may be indicative of the various ways in which the principles disclosed herein can be practiced. In addition, these aspects and any equivalents are intended to be within the scope of the claimed subject matter. Other advantages and novel features will become apparent from the following detailed description when considered in conjunction with the drawings.

DETAILED DESCRIPTION

Disclosed are techniques for generating and executing desired digital content as an executable graph via one or more processing units in a distributed computing fashion. Digital content may include, but is not limited to, 2-D image data, 3-D image data, audio data, camera positioning data, and haptic data. Image data may also encompass video data since video data is typically a stream of individual images. The executable graph may be referred to herein as a "task graph". Executing a task graph may produce an approximation of the originally intended digital content. This is distinct from executing and then transmitting the digital content to be rendered, and is distinct from executing, compressing, and transmitting compressed digital content to be decompressed and rendered.

A task graph may be an executable data structure implemented via sequential code that spawns multiple executions of parallel tasks that may be executed simultaneously. The task graph may be a collection of execution nodes. An execution node may define a specific data transformation that accepts one or more input data streams, and produces one or more output data streams. An execution node may be executed on a CPU or GPU, or a combination of both (e.g., load-sharing). The data transformation may be a manipulation of data such as, but not limited to, coordinate space rotations, data amplification, and illumination evaluation. The topology of a task graph may define how data moves through the execution nodes. This may include multi-pass and recursive relationships. The task graph may contain execution logic evaluations for conditional execution of execution nodes. Execution logic in a task graph may be a static or dynamic condition, including using the output of a previous execution node. The task graph may also point to data that exists external to the task graph.

Under the disclosed techniques, a producer of the task graph need not have the hardware necessary to execute the task graph, just create it. The producer may be referred to as the machine or computer that creates or produces the task graph based on a description of digital content data. A consumer of the task graph may use local hardware to reproduce the intended digital content data for local realization. Thus, the consumer may be referred to as the machine or computer that receives and executes the task graph. A consumer may traverse or execute the task graph, or both. Thus, no communication between the consumer and producer is required during execution of the task graph thereby freeing the bus used to deliver the task graph. The bus may include, but is not limited to a direct cable connection, a cabled network connection, a wireless connection, a traditional PCI bus, any other data connection between a producer and consumer, and any combination thereof. The wireless connection may include the 802.11 family of standards, the Bluetooth™ standard, other wireless communication protocols, or any RF cellular standards.

Figure 2:
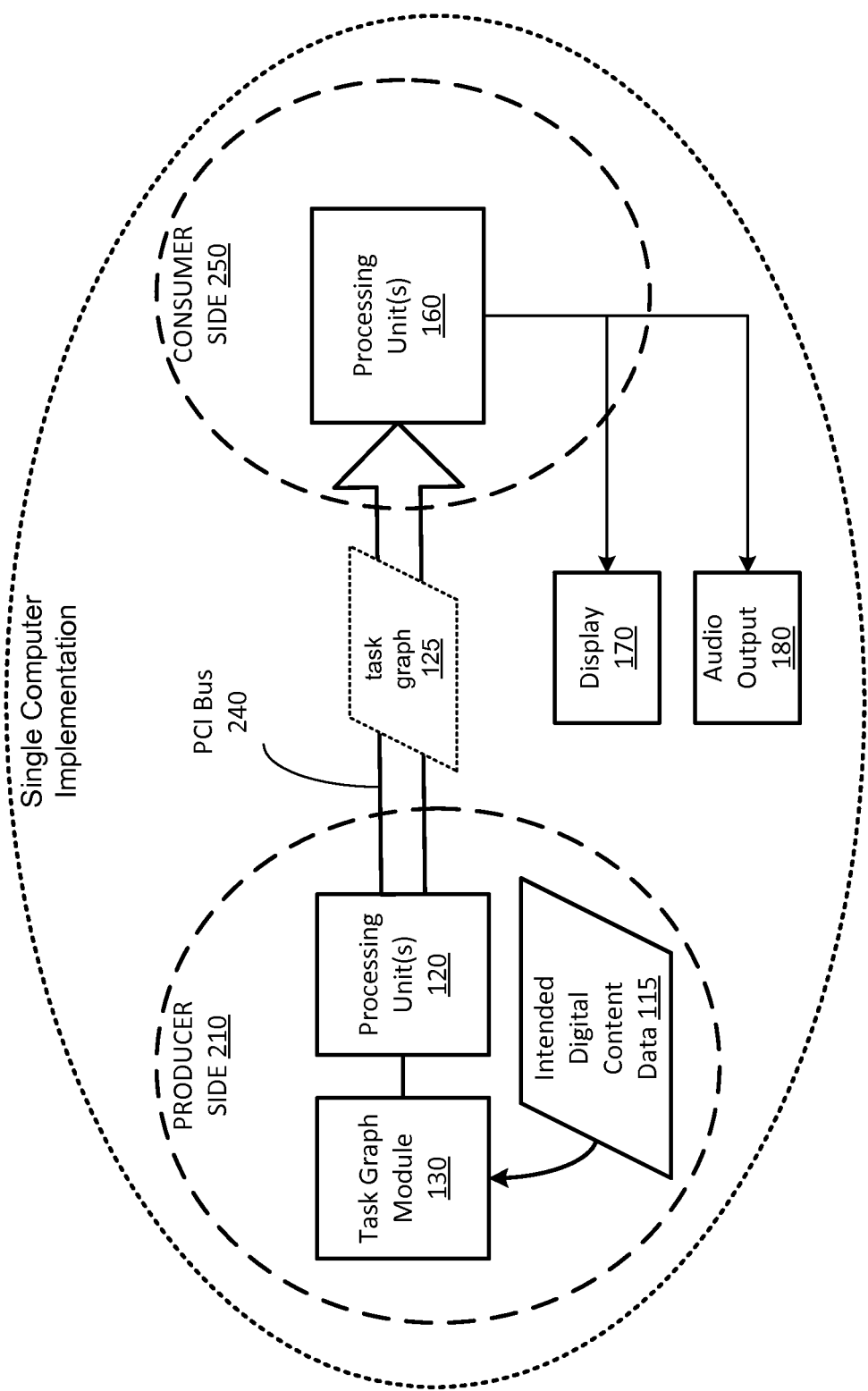
FIG. 2 illustrates one embodiment of a system for delivering task graphs from a producer portion of a computer to a consumer portion of the computer.

Processing units may act as a producer or a consumer, or as both. A processing unit may refer to any hardware capable of processing data, including but not limited to one or more GPUs, one or more CPUs, or heterogeneous combinations of one or more of either. A processing unit that acts as a producer may, but is not required to, possess the ability to act as a consumer. Thus, one embodiment may be a single processing unit that acts as both producer and consumer of a task graph. This is illustrated in FIG. 2.

A producer may produce, partially produce, or modify a task graph, or any combination thereof. This may include but is not limited to appending, replacing, or eliminating parts of a task graph, or embedding whole task graphs within other task graphs in a nested pattern. A consumer may partially consume an entire task graph or a section of a task graph. Thus, one embodiment may include a network of two or more processing units that act as both consumers and producers to produce, modify, and partially consume a task graph. Another embodiment may include two or more processing units that produce one task graph. Another embodiment may be one task graph that is passed to multiple consumers or one or more networks of processing units for full or partial consumption. In one embodiment, a producer may be a server computer system coupled to a bus as described above. In another embodiment, a producer may be a client device. A client device may also be a consumer such as, but not limited to, a mobile computing device, a smartphone, a tablet computer, a personal computer (PC), a game console device, or a heterogenous system on a chip (SoC). Thus, the present methodology may allow consumer devices to receive task graphs from server based producers over a network such as the Internet (e.g., cloud gaming delivery). Alternatively, a first client device may act as a producer and create task graphs for consumption and execution by other client or server devices in their role as a consumer.

For instance, one embodiment may be the delivery of 'cloud-gaming' via task graphs to an Xbox™ computer platform or Playstation™ computer platform from a server computer system acting as the producer. Another embodiment may be the delivery of task graphs from one computer platform (e.g., Xbox™) to another computer platform (e.g., Playstation™). The 'bus' used to deliver the task graphs in the above embodiments may include the aforementioned direct cable connection, cabled network connection, wireless connection and any combination thereof.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Task Graph Implementation

Figure 1:
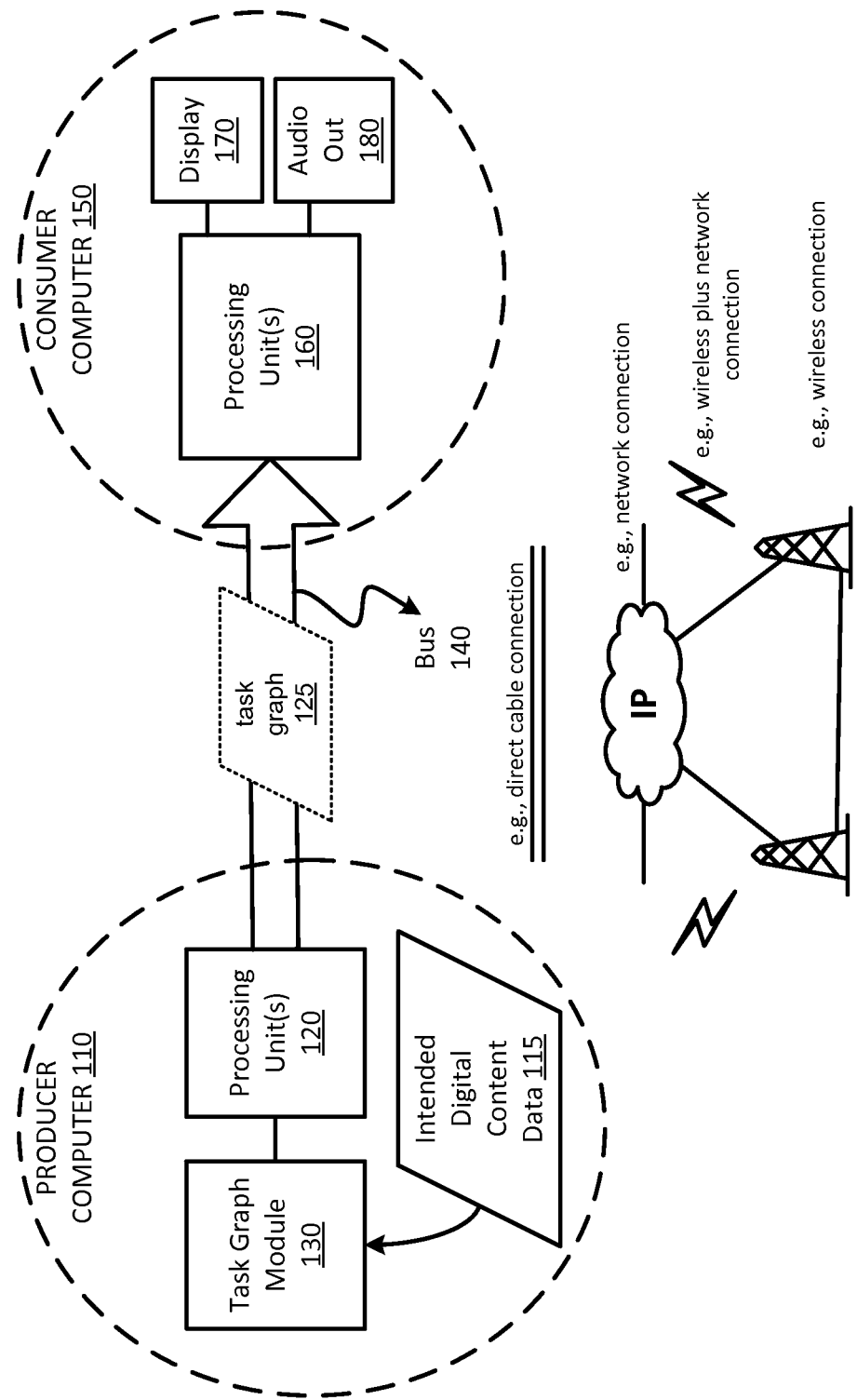
FIG. 1 illustrates one embodiment of a system for delivering task graphs from a producer computer to a consumer computer.

FIG. 1 illustrates one embodiment of a system 100 to render digital content data on a consumer computer 150 using a series of operations that exist in the form of a task graph 125. A task graph 125 is an executable data-structure that spawns multiple executions of parallel tasks that may be executed simultaneously. When executed, the task graph produces an approximation of originally intended digital content data. A producer computer 110 may generate the task graph 125 using a task graph module 130 under control of a processing unit 120. The processing unit 120 may be comprised of one or more central processing units (CPUs) and/or graphics processing units (GPUIs). The processing unit 120 may assist in creating the task graph 125 and putting it out on a protocol independent bus 140 for an intended consumer computer 150. The protocol independent bus 140 may comprise, for example, a direct cable connection, a cabled network connection, a wireless connection, a traditional PCI bus, any other data connection between a producer and consumer, and any combination thereof. The wireless connection may include the 802.11 family of standards, the Bluetooth™ standard, other wireless communication protocols, or any RF cellular standards.

Digital content data does not need to exist on the producer computer 110 before the task graph 125 is produced. That is, the antecedent to the task graph 125 is not pre-existing digital content, but rather intended digital content. The digital content data itself may not actually exist until it is generated by the consumer computer 150 when the task graph is executed. Because the digital content data does not need to exist before a task graph 125 describing it is generated, a producer computer 110 does not need the hardware to be able to execute/consume the task graph 125 in order to produce it (although it can). This allows devices to produce intended digital content data to be realized on other, different devices without having to be able to generate the content on its own hardware. For example, an iOS™ computer platform platform device may produce a task graph 125 that is executable on an Xbox™ computer platform device, while it could never consume the Xbox™ computer platform components of the task graph 125 itself.

A consumer computer 150, with processing units 160, may execute the task graph 125 to produce an approximation of the intended digital content data such that it may be displayed on a display 170, played back over an audio interface 180 (e.g., speakers), or both depending on whether the digital content data represents an image, audio, or any other realizable digital content. The processing unit(s) 160 within the consumer computer 150 may include one or more CPUs and/or GPUs.

For transport to a consumer computer 150, a task graph 125 may be serialized into a binary stream. Transport from a producer computer 110 to a consumer computer 150 may occur over one or more protocol independent buses 140 as previously described. In addition, a task graph 125 may be mutable meaning it may be de-constructed and sent as a binary stream in a non-serial fashion. The consumer computer 150 may then re-assemble the binary stream to reconstruct the task graph 125. It may also be possible to send different parts of a task graph 125 to different processing units 160 in different consumer computers 150 over multiple buses 140 based on the capabilities of the processing units 160.

As the binary stream comprising the task graph 125 is received, the consumer computer 150 may re-construct the original topology of the task graph 125 by executing the data structure comprising the task graph 125. The consumer computer 150 may then produce an approximation of the originally intended digital content data which may be rendered on a display 170, played back over an audio interface 180, and/or realized on a haptic interface.

FIG. 2 illustrates one embodiment of a system for delivering task graphs from a producer portion of a computer to a consumer portion of the same computer system. In this embodiment, a single computer may be partitioned into a producer side 210 and a consumer side 220. Processing units 120 on the producer side 210 create the task graph 125 representative of intended digital content data 115 via the task graph module 130. The task graph 125 may then be sent to the consumer side 250 over an internal PCI bus 240. Processing units 160 on the consumer side 250 may execute the task graph 125 and render an approximation of the digital content data 115 on a display 170, played back over an audio interface 180, and/or realized on a haptic feedback interface.

Included herein may be a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
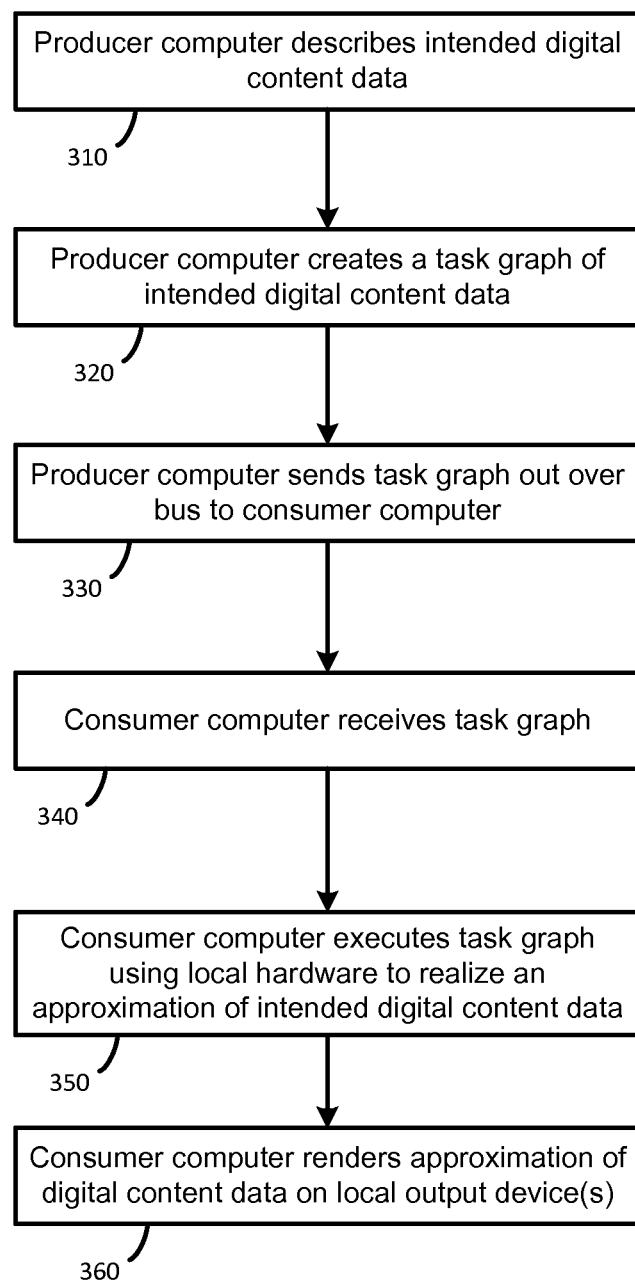
FIG. 3 illustrates one embodiment of a logic flow in which a live authoring tool may be used to modify the content of a video game application during development.

FIG. 3 illustrates one embodiment of a logic flow 300 in which intended digital content data may be processed into a task graph 125 by a producer computer 110 and delivered to a consumer computer 150 over a bus 140. The logic flow 300 may be representative of some or all of the operations executed by one or more embodiments described herein including those illustrated in FIG. 1.

In the illustrated embodiment shown in FIG. 3, the logic flow 300 may describe intended digital content data 115 at block 310. For example, a producer computer 110 may describe intended digital content data 115 coming from an application executing on the producer computer 110. The application may be, for instance, a video game application that generates 2-D image data to be rendered on a display. The application may be any application that results in output that may be transformed into digital content data 115. The embodiments are not limited to these examples.

In the illustrated embodiment shown in FIG. 3, the logic flow 300 may create a task graph 125 of the intended digital content data 115 at block 320. For example, a producer computer 110 may utilize a task graph module 130 executing under the control of a CPU 120 to manipulate the intended digital content data 115 into a task graph 125. A task graph may be an executable data structure implemented via sequential code that spawns multiple executions of parallel tasks that may be executed simultaneously. The task graph may be a collection of execution nodes. An execution node may define a specific data transformation that accepts one or more input data streams, and produces one or more output data streams. An execution node may be executed on a CPU or GPU, or a combination of both (e.g., load-sharing). The data transformation may be a manipulation of data such as, but not limited to, coordinate space rotations, data amplification, and illumination evaluation. The topology of a task graph may define how data moves through the execution nodes. This may include multi-pass and recursive relationships. The task graph may contain execution logic evaluations for conditional execution of execution nodes. Execution logic in a task graph may be a static or dynamic condition, including using the output of a previous execution node. The task graph may also point to data that exists external to the task graph. The embodiments are not limited to this example.

In the illustrated embodiment shown in FIG. 3, the logic flow 300 may send the task graph 125 to a consumer computer 150 at block 330. For example, a bus 140 may physically separate the producer computer 110 from the consumer computer 150. The task graph 125 may be formatted for transmission across the bus 140. The bus 140 may comprise a direct end-to-end cable connection, a networked connection, and/or a wireless connection or any combination thereof. The logic flow 300 may then receive the task graph 125 in the consumer computer 150 over bus 140 at block 340. The embodiments are not limited to these examples.

In the illustrated embodiment shown in FIG. 3, the logic flow 300 may execute the task graph 125 at block 350. For example, a processing unit 160 comprised of a combination of CPUs and GPUs executing locally in the consumer computer 150 may execute the task graph 125 to realize an approximation of the intended digital content data. The embodiments are not limited to this example.

In the illustrated embodiment shown in FIG. 3, the logic flow 300 may render an approximation of the intended digital content data at block 360. For example, upon execution, the consumer computer 150 may render an approximation of the intended digital content data on the appropriate output device such as a local display 170 or a speaker 180 coupled with the consumer computer 150. The embodiments are not limited to this example.

FIFO Queue Implementation

One particular embodiment may represent a method for server-side simulation (e.g., "cloud processing") and client-side realization (e.g., "local rendering") of a computer application such as, for instance, a video game. Such an embodiment may be referred to as a first-in-first-out (FIFO) queue implementation in which an abstraction layer allows the mechanism to work transparently from the hosted video game application. The abstraction layer also allows applications to be realized on platforms that were not originally supported by the application code. For instance, a PC application may be realized on an iOS™ device. The application is actually realized and rendered on the target platform (client), using the client's native hardware according to its own hardware resources. This is different from existing "cloud gaming" scenarios that typically involve server-side realization and video streaming to the client.

In a typical video game console, the CPU is loosely coupled with the GPU. They communicate with each other via a bus. In general, the traffic on this communication channel is one direction in which the CPU is the "producer" and the GPU is the "consumer". The data on the channel may be a mixture of command opcodes and command payloads. The commands may be generated on the CPU via an application programming interface (API). The generated commands are passed to the GPU over the bus. The front-end interface of the GPU is a FIFO queue. Commands from the CPU 'stack up' in the FIFO queue, waiting for execution. This channel is asynchronous and pipelined. The actual execution latency on this command queue may typically be from 16 to 30 milliseconds which is significant.

Figure 4:
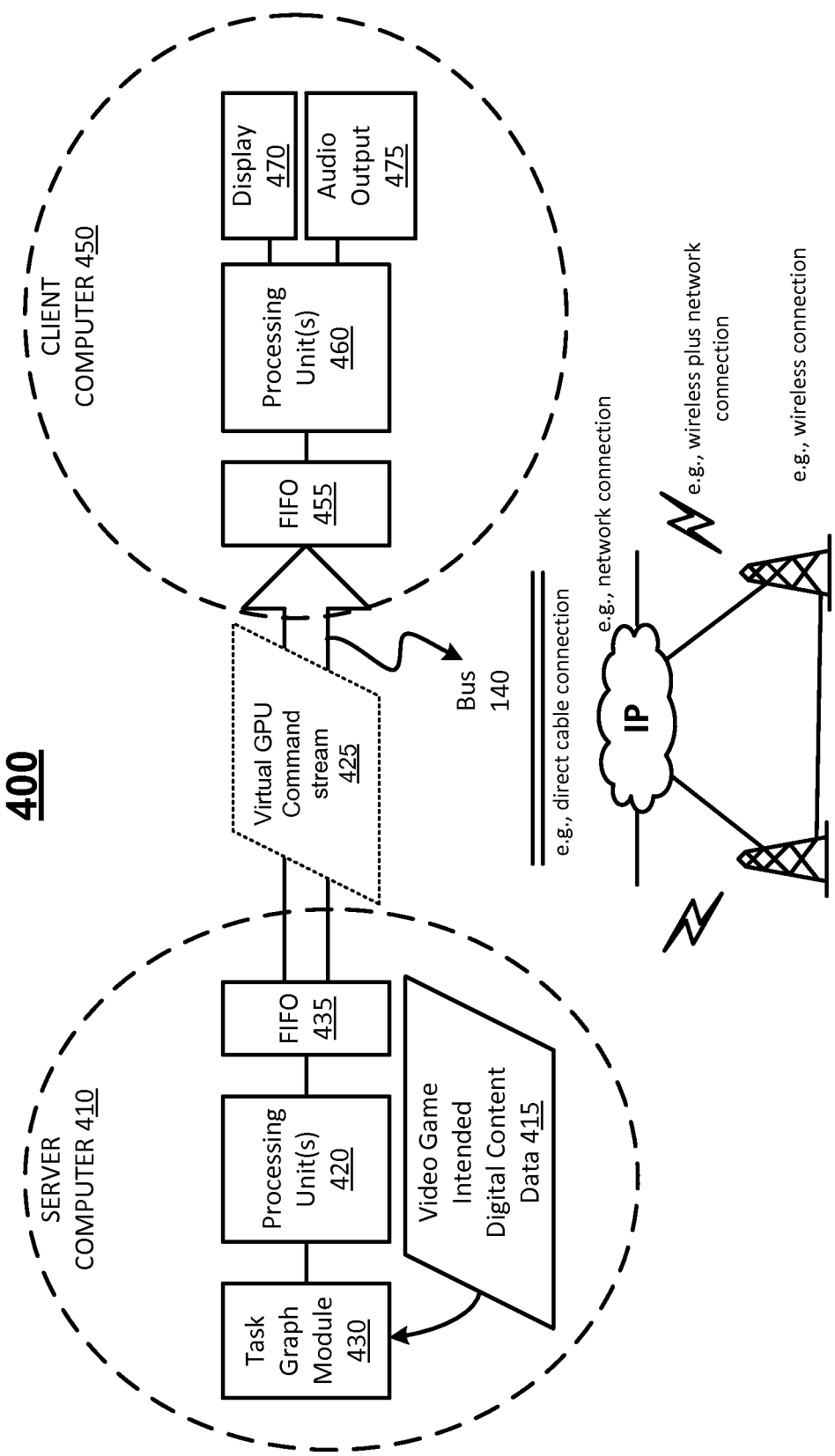
FIG. 4 illustrates one embodiment of a system for delivering a virtual GPU command stream from a server computer system to a client device.

Referring now to FIG. 4, the system and method may physically decouple a processing unit on a producer computer 410 from a processing unit on a consumer computer 450—no matter the distance. An intervening physical network (i.e., bus 140) such as, but not limited to, the Internet may become the bus (e.g., channel) and introduces distributed processing concepts to the traditional CPU/GPU pipeline. To enable this, a processing unit front-end interface (e.g., FIFO 435, 455) may be included on both the producer computer 410 and the consumer computer 450. The two software FIFOs 435, 455 may be replicated and chained together thereby maintaining asynchronous and pipelined execution. As this channel is already latency tolerant, the introduction of the networked transport is less disruptive than it initially sounds. If the server computer CPU 420 and client computer GPU 460 are within a few milliseconds from each other, the transport latency can be completely absorbed (hidden) by the interface.

This implementation creates a 'virtual GPU' command stream rather than hardware-specific opcodes. The virtual GPU command stream may be a specific implementation of the task graphs previously described. The virtual GPU command stream may also be logically split into a 'lossless' stream comprised of command data and a 'lossy' stream comprised of payload data. Payload data may be variable bit rate in terms of quality of service (QOS) depending on available bandwidth on the channel (bus 140). The client computer 450 may be characterized as a "GPU" for conceptual reasons. In reality, the client computer 450 may be assumed to include one or more CPUs, plus one or more GPUs (collectively processing units 460). In contrast, the server computer 410 processing unit 420 is not assumed to have a physical GPU. A client computer CPU may handle the network stack and maintain the software FIFO 455. In addition, a client computer CPU may be commanded via the same FIFO stream. Using this, the client computer 450 may be instructed to CPU-transform data before physical submission to a GPU. For example, the client CPU may transform the virtual GPU command stream in a manipulation of at least one of a coordinate space rotation, a data amplification, a data compression, a data optimization, and an illumination evaluation to hardware specific API level commands via a device specific native interpreter before submission to a client graphics processing unit (GPU). This implementation pulls data from the FIFO, and performs two transforms. The first is compression by weeding out extraneous or implicit data. The second includes hardware specific shading and lighting algorithms to change the "look" or "interpretation" of that data on the rendering device.

This allows a high level of abstraction in the 'virtual GPU' command stream.

This abstraction allows for mixing and matching server and client hardware, and associated interfaces (e.g., platforms). In one example, an X-box 360 platform console may serve an iOS platform client. In another example, a cloud CPU platform and PS3 platform may serve an X-Box 360 client. In yet another example, an iOS platform client may transition from an X-box 360 platform server to a cloud CPU, and from WiFi to RF 3G, without disruption. The embodiments are not limited by these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints. User input, however, may stream across the bus from a consumer to a producer. User input may include, but is not limited to, camera orientation data, voice input data, handheld controller input data, and spatially tracked motion or position data.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer implemented method comprising:
   by one or more processors configured with computer-readable instructions,
   receiving, by a client computing system from a server computing system, a stream of executable instructions configured to generate digital content data on the client computing system, wherein the executable instructions being generated by the server computing system based on simulation of a video game during runtime without generating the digital content data on the server computing system, wherein the executable instructions comprise commands executable by the client computing system to generate the digital content data;
   executing the executable instructions locally on the client computing system to generate the digital content data, wherein the executable instructions within the stream of executable instructions are executed asynchronously without additional communication from the server computing system, wherein the stream of executable instructions comprises lossless data and lossy data; and
   rendering the digital content data using hardware computing resources of the client computing system.

2. The method of claim 1, the executable instructions comprising instructions executable by at least one of a central processing unit (CPU) or a graphics processing unit (GPU).

3. The method of claim 1 further comprising executing the executable instructions by a CPU of the client computing system to generate instructions for execution by a GPU of the client computing system.

4. The method of claim 1, wherein the instructions for execution by a GPU are hardware specific application programming interface (API) commands for the GPU.

5. The method of claim 1 further comprising outputting the rendered digital content data to hardware coupled to the client computing system.

6. The method of claim 1, wherein the rendered digital content data is at least one of graphical digital content or audio digital content.

7. The method of claim 1, wherein the server computing system is a first type of hardware computing platform and the client computing system is a different type of hardware computing platform.

8. The method of claim 1, wherein the executable instructions are received as a binary stream in a non-serial fashion.

9. The method of claim 8 further comprising assembling the received binary stream to reconstruct the executable instructions.

10. A server computing system comprising:
    at least one hardware processor configured with computer readable instructions that configure the at least one hardware processor to:
    generate executable instructions based on simulation of a video game by the server computing system, wherein the executable instructions comprise commands executable by a client computing system to generate digital content data for the video game, wherein the executable instructions are generated without generating the digital content data on the server computing system;
    transmit, to a client computing system over a network, a stream of executable instructions configured to generate digital content data on the client computing system;
    wherein the executable instructions are executed locally on the client computing system to generate the digital content data, wherein the executable instructions within the stream of executable instructions are executed asynchronously without additional communication from the server computing system, wherein the stream of executable instructions comprises lossless data and lossy data; and
    wherein the digital content data is rendered using hardware computing resources of the client computing system.

11. The server computing system of claim 10, wherein the executable instructions comprising instructions executable by at least one of a central processing unit (CPU) or a graphics processing unit (GPU).

12. The server computing system of claim 10, wherein the executable instructions are configured to be executed by a CPU of the client computing system to generate instructions for execution by a GPU of the client computing system.

13. The server computing system of claim 12, wherein the instructions for execution by a GPU are hardware specific application programming interface (API) commands for the GPU.

14. The server computing system of claim 10, wherein the rendered digital content data is at least one of graphical digital content or audio digital content.

15. The server computing system of claim 10, wherein the server computing system is a first type of hardware computing platform and the client computing system is a different type of hardware computing platform.

16. The server computing system of claim 10, wherein the executable instructions are transmitted as a binary stream in a non-serial fashion.

17. The server computing system of claim 10, wherein the digital content data is not generated by the server computing system.

* * * * *